(12) United States Patent
Pozhidaev et al.

(10) Patent No.: US 10,451,948 B2
(45) Date of Patent: Oct. 22, 2019

(54) STANDING HELIX FERROELECTRIC LIQUID CRYSTAL DISPLAY CELL

(71) Applicant: The Hong Kong University of Science and Technology, Hong Kong (CN)

(72) Inventors: Evgenii P. Pozhidaev, Moscow (RU); Alexei D. Kiselev, Chernigov (UA); Abhishek K. Srivastava, Lucknow (IN); Vladimir G. Chigrinov, Hong Kong (CN); Hoi Sing Kwok, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 3 days.

(21) Appl. No.: 15/544,995

(22) PCT Filed: Jan. 20, 2016

(86) PCT No.: PCT/CN2016/071434
§ 371 (c)(1),
(2) Date: Jul. 20, 2017

(87) PCT Pub. No.: WO2016/116040
PCT Pub. Date: Jul. 28, 2016

(65) Prior Publication Data
US 2018/0017833 A1 Jan. 18, 2018

Related U.S. Application Data
(60) Provisional application No. 62/125,350, filed on Jan. 20, 2015.

(51) Int. Cl.
*G02F 1/141* (2006.01)
*G02F 1/1337* (2006.01)
*G02F 1/1343* (2006.01)

(52) U.S. Cl.
CPC .......... *G02F 1/1418* (2013.01); *G02F 1/1337* (2013.01); *G02F 1/13439* (2013.01);
(Continued)

(58) Field of Classification Search
None
See application file for complete search history.

(56) References Cited

U.S. PATENT DOCUMENTS

| 4,813,767 | A | * | 3/1989 | Clark | ...................... | C09K 19/02 349/124 |
| 5,020,883 | A | | 6/1991 | Era et al. | | |

(Continued)

FOREIGN PATENT DOCUMENTS

| CN | 1326560 A | 12/2001 |
| CN | 102289096 A | 12/2011 |

(Continued)

OTHER PUBLICATIONS

Pozhidaev et al., "Orientational Kerr effect and phase modulation of light in deformed-helix ferroelectric liquid crystals with subwavelength pitch," Phys. Rev. E, 87, 052502 (2013).*

(Continued)

Primary Examiner — Ryan Crockett
(74) Attorney, Agent, or Firm — Leydig, Voit & Mayer, Ltd.

(57) ABSTRACT

A standing helix ferroelectric liquid crystal display cell includes: two transparent substrates (102A, 102B); a ferroelectric liquid crystal layer (104) comprising ferroelectric liquid crystals in a standing helix configuration, the ferroelectric liquid crystal layer (104) being disposed between the two transparent substrates (102A, 102B), the ferroelectric liquid crystals having a helix axis perpendicular to the two substrates (102A, 102B) and chiral smectic liquid crystal helix pitch shorter than a wavelength of a polarized light (Continued)

normally impinging at least one of the two transparent substrates (102A, 102B); and inter-digital electrodes (105), disposed in plane with the two transparent substrates (102A, 102B), configured to apply an electric field to the ferroelectric liquid crystal layer (104) that provides a driving voltage below a critical voltage for helix unwinding.

16 Claims, 8 Drawing Sheets

(52) U.S. Cl.
 CPC ........ *G02F 1/134309* (2013.01); *G02F 1/141* (2013.01); *G02F 2001/133742* (2013.01); *G02F 2201/124* (2013.01); *G02F 2203/06* (2013.01)

(56) References Cited

U.S. PATENT DOCUMENTS

| | | | |
|---|---|---|---|
| 5,168,381 A | 12/1992 | Walba | |
| 5,189,536 A | 2/1993 | Hanyu et al. | |
| 5,353,136 A | 10/1994 | Escher et al. | |
| 5,555,117 A | 9/1996 | Clark et al. | |
| 5,617,229 A | 4/1997 | Yamamoto et al. | |
| 5,818,548 A | 10/1998 | Funfschilling et al. | |
| 6,075,583 A | 6/2000 | Mason et al. | |
| 6,295,112 B1 | 9/2001 | Kabe et al. | |
| 6,509,887 B1 | 1/2003 | Kondoh et al. | |
| 6,567,065 B1 | 5/2003 | Kondoh et al. | |
| 6,757,035 B2 | 6/2004 | Choi et al. | |
| 6,900,874 B1 | 5/2005 | Dultz et al. | |
| 7,042,527 B2 | 5/2006 | Imai | |
| 7,212,269 B2 | 5/2007 | Choi et al. | |
| 7,361,389 B2 | 4/2008 | Furue et al. | |
| 7,486,304 B2 | 2/2009 | Bergquist et al. | |
| 7,505,015 B2 | 3/2009 | Shimada | |
| 7,612,862 B2 | 11/2009 | Noguchi | |
| 7,808,604 B2 | 10/2010 | Choi et al. | |
| 7,907,236 B2 | 3/2011 | Komitov et al. | |
| 8,755,022 B2 | 6/2014 | Chigrinov et al. | |
| 2011/0285928 A1* | 11/2011 | Chigrinov | G02F 1/1416 349/33 |
| 2012/0140133 A1* | 6/2012 | Choi | G02F 1/134363 349/33 |
| 2013/0169909 A1 | 7/2013 | Srivastava et al. | |
| 2014/0118650 A1 | 5/2014 | Srivastava et al. | |
| 2014/0313468 A1* | 10/2014 | Fujisawa | G02F 1/1416 349/168 |
| 2015/0286100 A1* | 10/2015 | Yan | G02F 1/133723 524/600 |

FOREIGN PATENT DOCUMENTS

| | | | |
|---|---|---|---|
| CN | 103513485 A | | 1/2014 |
| WO | WO 00/31582 | * | 6/2000 |
| WO | WO 00/31582 A1 | | 6/2000 |
| WO | WO 02/29481 A1 | | 4/2002 |

OTHER PUBLICATIONS

Beresnev et al., "Electro-optical effect in ferroelectric liquid crystal with small helix pitch and high spontaneous polarization", *Pis'ma v Z E T F*, USSR, 46, No. 8, 328-330 (1987).

Beresnev et al., "Deformed helix ferroelectric liquid crystal display—a new electrooptic mode in ferroelectric smectic C* liquid crystals", Liquid Crystals, 5, N4, 1171-1177 (1989).

Fujisawa et al., "V-Shaped E-O Properties of Polymer Stabilized (PSV-) FLCD Free from Conventional Surface Stabilization: Advanced Color Sequential LCDs", IDW'08 Digest, p. 1563-1566 (2008).

Pozhidaev et al., "V-shaped electro-optical mode based on deformed-helix ferroelectric liquid crystal with subwavelength pitch," Journal of the SID (2012).

State Intellectual Property Office of the P.R. China, International Search Report in International Application No. PCT/CN2016/071434 (dated Apr. 14, 2016).

* cited by examiner

STANDING HELIX FERROELECTRIC LIQUID CRYSTAL DISPLAY CELL

CROSS-REFERENCE TO RELATED APPLICATIONS

This application is a U.S. National Phase application under 35 U.S.C. § 371 of International Patent Application No. PCT/CN2016/071434, filed Jan. 20, 2016, which is a PCT application claiming the benefit of U.S. Provisional Patent Application No. 62/125,350, filed Jan. 20, 2015, both of which are incorporated by reference in their entireties.

BACKGROUND

Liquid crystal display (LCD) devices have found widespread commercial applications in a variety of fields ranging from calculators to television sets because of their excellent display performance rivaling that of the cathode ray tube, their space-saving features exemplified by thin and lightweight construction, and other useful features such as low power consumption.

Color displays are based on an "additive color mixing process." When two or more colored light beams enter the human eye, the light beams are combined on the retina and perceived as different colors. Based on this principle, any color can be obtained by additively mixing light beams of the three primary colors—R (red), G (green) and B (blue)—in appropriate proportions.

One way of achieving "additive color mixing" is a "simultaneous additive color mixing process." In color LCD devices, three color filters corresponding to R, G and B are used in combination with three LCD panels, and three color images are simultaneously projected onto a screen such that the color images are superimposed and merged into one displayed image.

Another way of achieving "additive color mixing" is a "successive additive color mixing process." This process utilizes the temporal resolution limit of the human eye. More specifically, this process utilizes the phenomenon that when successive color changes are too fast for the human eye to perceive, the persistence of the previous color causes the color to be mixed with the succeeding color such that the successive colors are combined and perceived as one color to the human eye.

Both the "simultaneous" and "successive" mechanisms for mixing colors are able to achieve any desired color for each pixel of a display, such that the display provides a high resolution image as well as excellent color reproduction.

SUMMARY

In an exemplary embodiment, the invention provides a standing helix ferroelectric liquid crystal display cell includes: two transparent substrates; a ferroelectric liquid crystal layer comprising ferroelectric liquid crystals in a standing helix configuration, the ferroelectric liquid crystal layer being disposed between the two transparent substrates, the ferroelectric liquid crystals having a helix axis perpendicular to the two substrates and chiral smectic liquid crystal helix pitch shorter than a wavelength of a polarized light normally impinging at least one of the two transparent substrates; and inter-digital electrodes, disposed in plane with the two transparent substrates, configured to apply an electric field to the ferroelectric liquid crystal layer that provides a driving voltage below a critical voltage for helix unwinding.

In another exemplary embodiment, the invention provides a field sequential color display, comprising a standing helix ferroelectric liquid crystal display cell, the standing helix ferroelectric liquid crystal display cell comprising: two transparent substrates; a ferroelectric liquid crystal layer comprising ferroelectric liquid crystals in a standing helix configuration, the ferroelectric liquid crystal layer being disposed between the two transparent substrates, the ferroelectric liquid crystals having a helix axis perpendicular to the two substrates and chiral smectic liquid crystal helix pitch shorter than a wavelength of a polarized light normally impinging at least one of the two transparent substrates; and inter-digital electrodes, disposed in plane with the two transparent substrates, configured to apply an electric field to the ferroelectric liquid crystal layer that provides a driving voltage below a critical voltage for helix unwinding; wherein the field sequential color display is configured to generate a color image by integration of images in fast switching distinct color fields.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Field sequential color (FSC) display devices are based on the "successive" mechanisms for mixing colors, and are able to achieve certain advantages over displays relying on the "additive" mechanism for mixing colors. For example, the complex and expensive technological processes associated with manufacturing devices using three color filters can be avoided for FSC display devices. Additionally, the light transmission efficiency for an FSC display device is significantly higher than for devices using color filters, as the light provided by the FSC display device does not have to pass through three different color filters. This allows for FSC display devices to achieve lower power consumption and/or higher brightness over non-FSC display devices at the same resolution level.

On the other hand, for FSC LCD devices, the operating speed will also need to be relatively higher than non-FSC LCD devices. For example, to achieve a color frame frequency of 240 Hz, an FSC LCD device would need to have a drive frequency of at least around 720 Hz. With conventional FSC LCD devices, such a high modulation rate may introduce various problems, for example, relating to hysteresis, temperature-dependence, and/or requiring complex material processing.

Embodiments of the present invention provide a standing helix ferroelectric liquid crystal display cell whose helix pitch, in order to avoid effects of the polarization plane rotation, is sufficiently shorter than the wavelength of polarized light (e.g., depending on the operational wavelength for a display, which may correspond to, for example, blue light) passing through a liquid crystal layer sandwiched between two transparent plates with inter-digital electrodes on one or both of the surfaces. That is, the pitch of the material should be short enough to avoid the material acting as a waveguide that rotates the plane of polarization of the impinging light. The helix axis is perpendicular to the substrates, and a source of voltage applied to the electrodes of the cell, at the voltage amplitude below the critical voltage of the helix unwinding. The liquid crystal has one equilibrium state characterized by the undistorted helix without applied voltage, when the principal optical axis is directed along the helix axis. The axis turns around the electric field under the action of driving voltage providing thereby continuous modulation of light that is hysteresis free and insensitive to the driving voltage polarity. That shows gray scale in electrically controlled phase shift if the incident linearly polarized light is impinging onto the substrates and the light polarization plane is either parallel or perpendicular to the electric field for the driving voltage of the frequency ranged between 10 Hz and 5 kHz.

Standing helix ferroelectric liquid crystal display cells according to various embodiments of the invention provide fast response time and continuous gray scale, and are usable in FSC LCD devices as well as in other applications, such as fast response photonics devices (e.g., modulators, filters, attenuators, etc.). These standing helix ferroelectric liquid crystal display cells exhibit hysteretic free and insensitive to the driving voltage polarity that provide continuous gray scale in light transmission state. The electrically-controlled phase shift results in a change in the transmittance and thus the gray scale.

Figure 1:
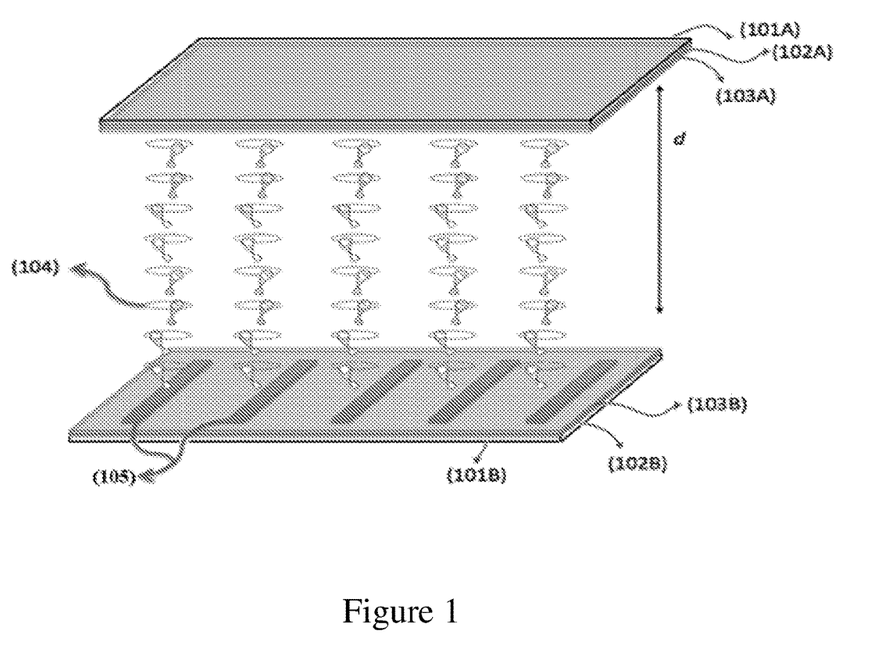
FIG. 1 depicts a standing helix ferroelectric liquid crystal display cell in an exemplary embodiment.

FIG. 1 depicts a standing helix ferroelectric liquid crystal display cell in an exemplary embodiment. The standing helix ferroelectric liquid crystal display cell includes crossed polarizers (101A, 101B), glass substrates (102A, 102B), alignment layers (103A, 103B), a liquid crystal layer having standing helix ferroelectric liquid crystals (104), and inter-digital electrodes (105).

Specifically, the liquid crystal layer is a chiral liquid crystal layer having standing helix ferroelectric liquid crystals of chiral smectic C* phase whose helical structure has a pitch $p_0$ smaller than the gap d. The pitch $p_0$ is also smaller than the wavelength of the light (e.g., for displays, less than 450 nm). The liquid crystal layer is sandwiched between the first and the second substrates. For any boundary conditions between the liquid crystal and the substrates, the standing helix configuration is provided.

Exemplary embodiments of the invention are based on using standing helix deformed helix ferroelectric liquid crystals (i.e., corresponding to a vertical alignment). Deformed helix ferroelectric liquid crystals are characterized by hysteresis free electro-optical response in the planner configuration, and the same features are also replicated in the standing helix configuration. Furthermore, the standing helix configuration and vertical alignment provide Kerr-like non-linearity which is advantageous for different applications. Some details regarding the Kerr effect in deformed-helix ferroelectric liquid crystals may be found, for example, in E. P. Pozhidaev et al., "Orientational Kerr effect and phase modulation of light in deformed-helix ferroelectric liquid crystals with subwavelength pitch," Physical Review E 87, 052502 (2013), which is incorporated by reference herein in its entirety.

In an exemplary embodiment, the standing helix configuration is achieved using a very hydrophobic alignment layer (the hydrophobicity provides the vertical alignment, and generally higher hydrophobicity is better). In an exemplary implementation, the very hydrophobic alignment layer is made of chromium salt.

Figure 2:
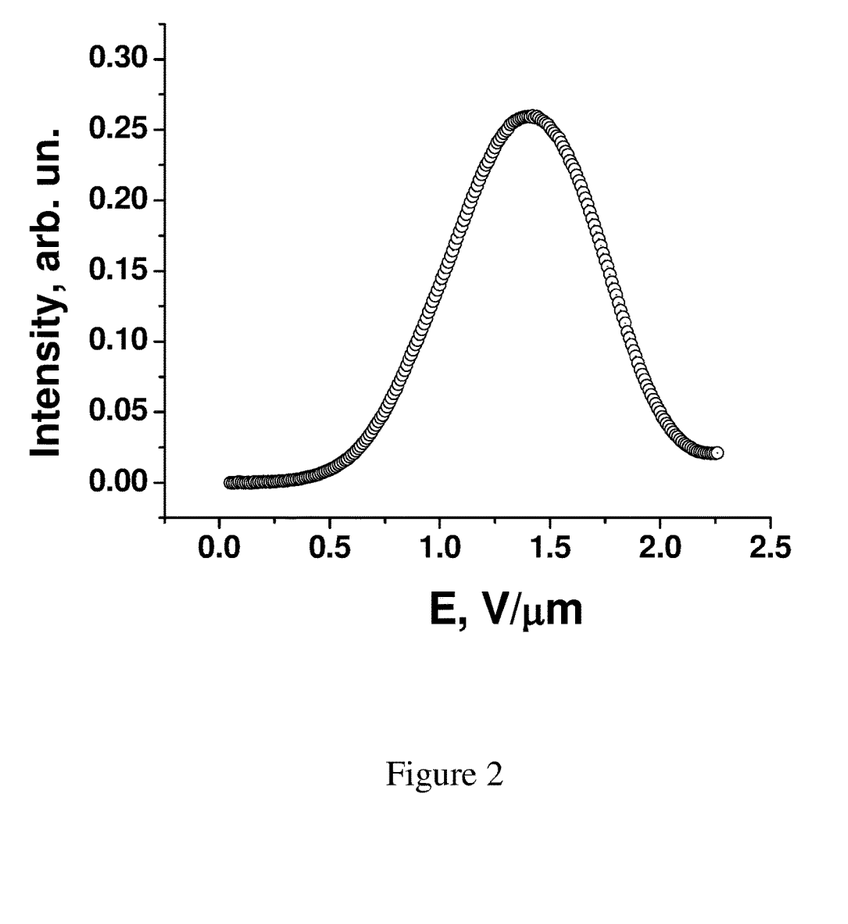
FIG. 2 is a plot depicting the intensity (in arbitrary units) for a standing helix ferroelectric liquid crystal display cell based on the electric field applied across the liquid crystal layer.

On applying an applied driving voltage V, which should be less than a critical voltage (herein abbreviated as $V_c$) of the helix unwinding, the standing helix ferroelectric LCD cell shows electro-optical modulation wherein the transmittance shows non-liner dependence on the applied voltage (see FIG. 2). FIG. 2 is a plot depicting the intensity (in arbitrary units) of standing helix ferroelectric LCD cell based on the electric field applied across the liquid crystal layer. The intensity shows a Kerr effect-like dependence.

The electrically-controlled birefringence of deformed helix ferroelectric liquid crystal (DHF FLC) cells is the basis of fast electro-optical modulation of the impinging light, which is applicable in field sequential colors display devices. The electrically controlled birefringence $\Delta n_{eff}(E) = <n_e(E) - n_o(E)>$ is a sequence of the FLC helical structure deformation and deviation $\Delta\alpha(E)$ of the FLC principle axes in electric field.

Figure 3:
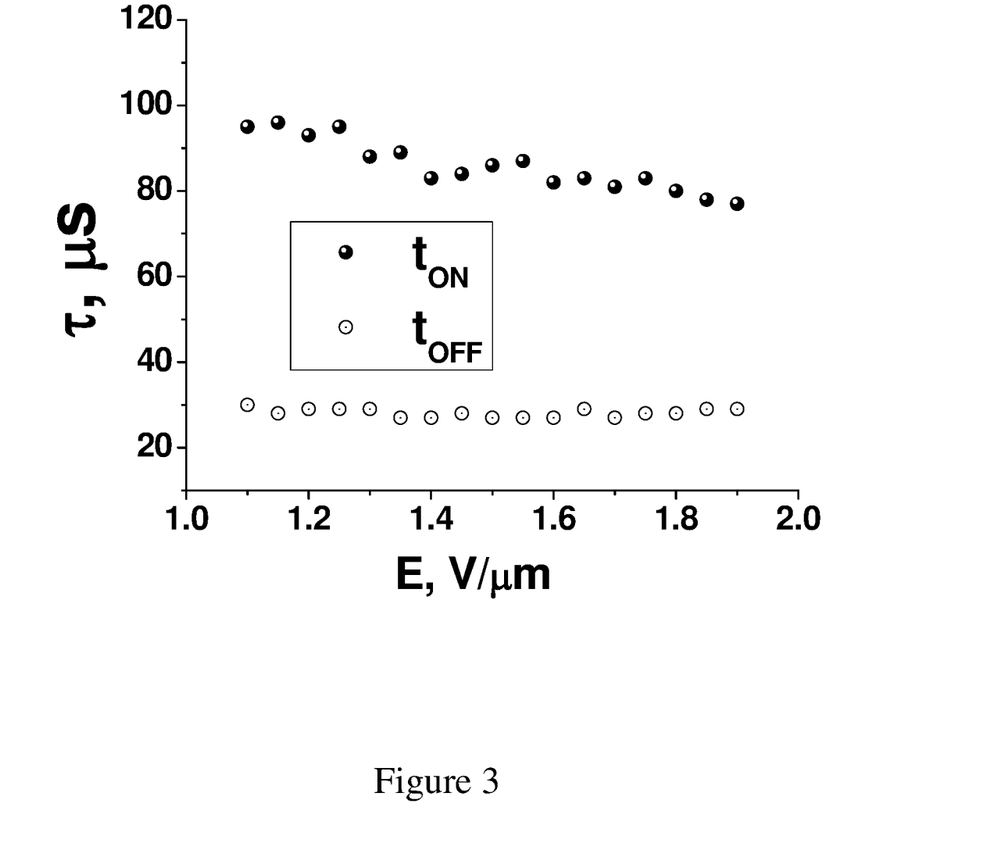
FIG. 3 is a plot for the switching time of an exemplary standing helix ferroelectric liquid crystal display cell as a function of the applied electric field.
Figure 4:
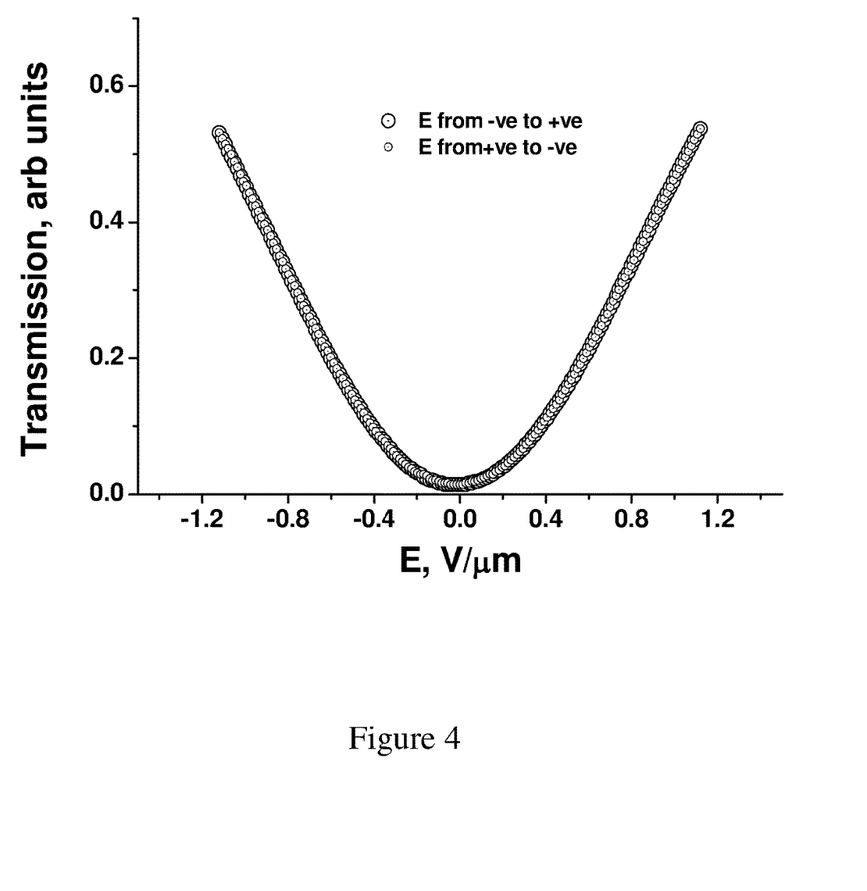
FIG. 4 is a plot of the transmittance as a function of the electric field by changing the electric field from negative to positive electric field (large circles) and by changing the electric field from positive to negative electric field in an opposite cycle (small circles)
Figure 5:
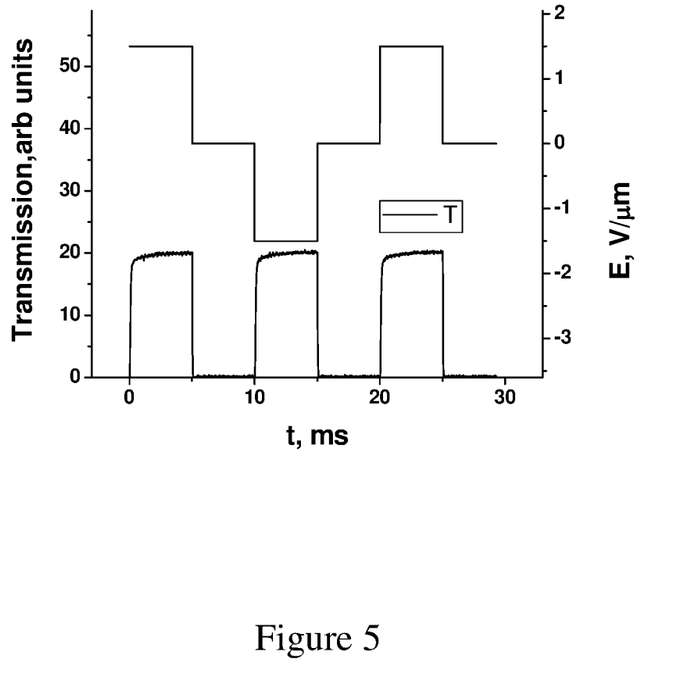
FIG. 5 depicts the electro-optical response of an exemplary standing helix ferroelectric liquid crystal display cell, where the top portion (corresponding to the right-side vertical axis) represents the applied electric field and the bottom portion (corresponding to the left-side vertical axis) represents the electro-optical response of the exemplary standing helix ferroelectric liquid crystal display cell.

FIG. 3 is a plot for the switching time of an exemplary standing helix ferroelectric liquid crystal display cell as a function of the applied electric field. FIG. 4 is a plot of the transmittance as a function of the electric field by changing the electric field from negative to positive electric field (large circles) and by changing the electric field from positive to negative electric field in an opposite cycle (small circles). The effects shown in FIG. 4 correspond to V-shape switching without any hysteresis in the electro-optical effects. FIG. 5 depicts the electro-optical response of an exemplary standing helix ferroelectric liquid crystal display cell, where the top portion (corresponding to the right-side vertical axis) represents the applied electric field and the bottom portion (corresponding to the left-side vertical axis) represents the electro-optical response of the exemplary standing helix ferroelectric liquid crystal display cell. The response is symmetric for both positive and negative polarities of the applied field.

FIGS. 3 and 4 show that, for an exemplary standing helix ferroelectric liquid crystal display cell, if the helix axes and the principle optical axes of the standing helix ferroelectric liquid crystal layer sandwiched between a pair of substrates and placed between two crossed polarizer and analyzer are parallel or perpendicular to the polarizer plane, and AC rectangular voltage pulses V<$V_c$ are applied to the liquid crystal, then the characteristic switching time is less than 100 µs (see FIG. 3) and the electro-optical response is not sensitive to the driving voltage polarity (see FIG. 4). Further, the exemplary standing helix ferroelectric liquid crystal display cell exhibits perfect high frequency V-shaped mode (see FIG. 4) in the envelope curve of light transmission saturation states with the symmetric rectangular alterative sign driving voltage pulses shown in FIG. 5.

In exemplary embodiments, there are two ways to generate gray scale for exemplary standing helix ferroelectric liquid crystal display cells. The first is depicted in FIG. 6, and the second is depicted in FIG. 7.

Figure 6:
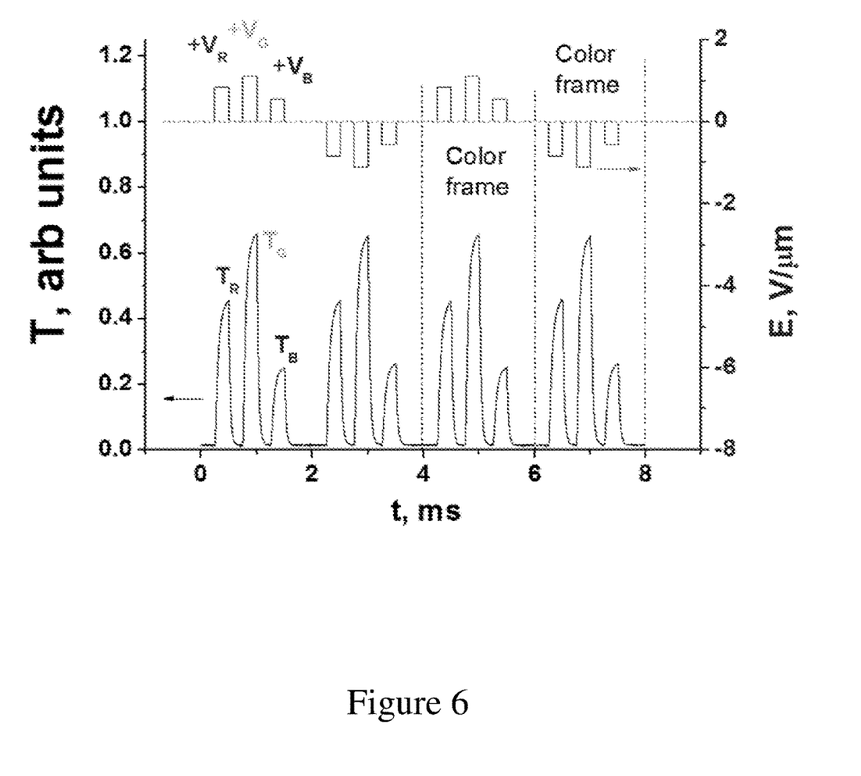
FIG. 6 is a plot depicting an analog driving scheme for an FSC display based on an exemplary standing helix ferroelectric liquid crystal display cell.

FIG. 6 is a plot depicting an analog driving scheme for an FSC display based on an exemplary standing helix ferroelectric liquid crystal display cell. As can be seen in FIG. 6, the gray scale is controlled the different magnitudes of applied voltage in different color fields. Further, inside the color frames the light transmission of any basic color do not depend on the driving voltage pulses polarity but on the amplitude only, so: $T_R(+V_R)=T_R(-V_R)$, $T_G(+V_G)=T_G(-V_G)$, $T_B(+V_B)=T_B(-V_B)$. Thus, the exemplary standing helix ferroelectric liquid crystal display cell provides electrically-controlled light transmission for any basic color of the light inside the color frame that is hysteretic free and non-sensitive to the driving voltage polarity, and is able to achieve any color based on the concept of additive color mixing.

Figure 7:
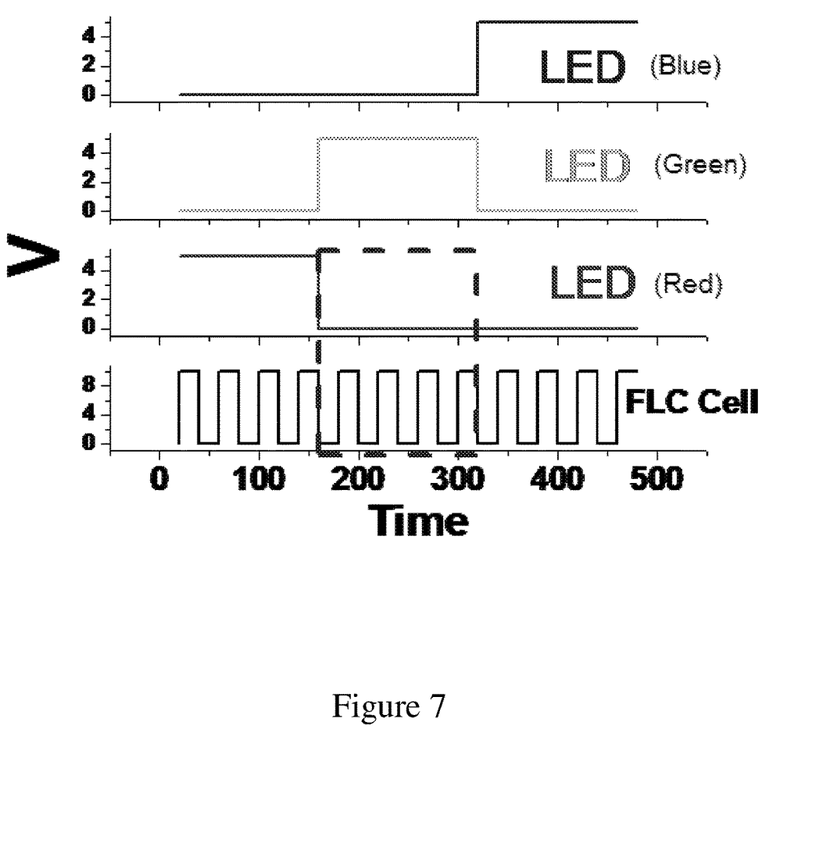
FIG. 7 is a plot depicting a digital driving scheme for an FSC display based on an exemplary standing helix ferroelectric liquid crystal display cell.

FIG. 7 is a plot depicting a digital driving scheme for an FSC display based on an exemplary standing helix ferroelectric liquid crystal display cell. As can be seen in FIG. 7, the gray scale is controlled by the pulse duration of electric pulses, with fixed magnitude, in different color fields. In other words, different gray scales are generated based on the modulation of the pulse duration rather than the magnitude of the driving pulse. By controlling the pulse duration, the light transmittance in each different sub-color frame can be controlled, allowing for different colors to be achieved.

Figure 8A:
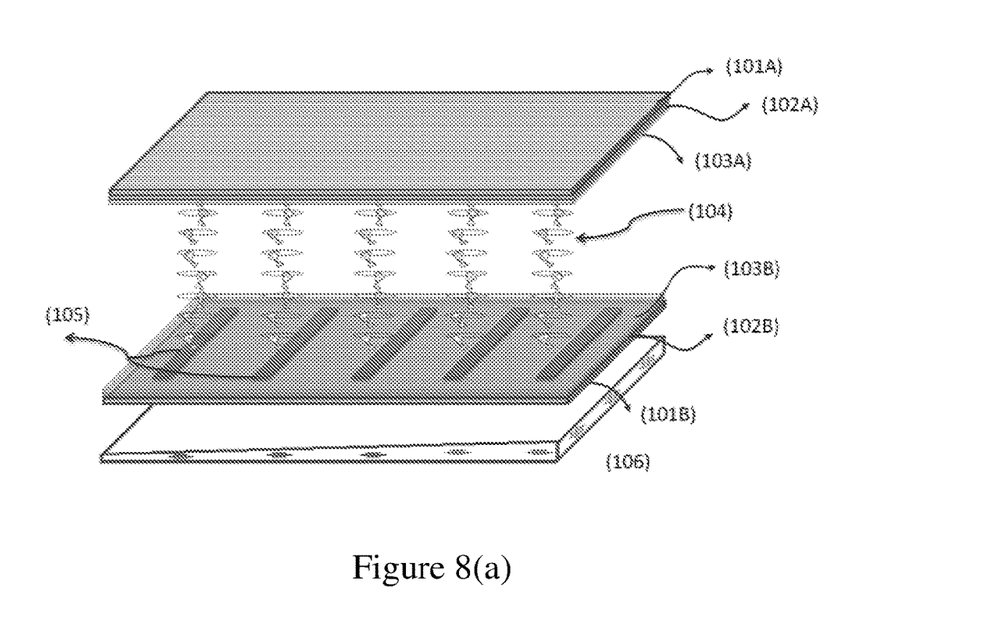
FIG. 8(a) depicts a FSC display based on a standing helix ferroelectric liquid crystal display cell in an exemplary embodiment.

FIG. 8(a) depicts a FSC display based on a standing helix ferroelectric liquid crystal display cell in an exemplary embodiment. Similar to the standing helix ferroelectric liquid crystal display cell shown in FIG. 1, the FSC display of FIG. 8(a) includes crossed polarizers (101A, 101B), glass substrates (102A, 102B), alignment layers (103A, 103B), a liquid crystal layer having standing helix ferroelectric liquid crystals (104), and inter-digital electrodes (105). FIG. 8(a) further includes a backlight, which in this example is a light-emitting diode (LED) backlight (106). The LED backlight (106) is a light source having different LEDs of different colors. An in-plane electric field is provided via the inter-digital electrodes (105). In an exemplary implementation, the display frequency is set to 240 Hz.

Figure 8B:
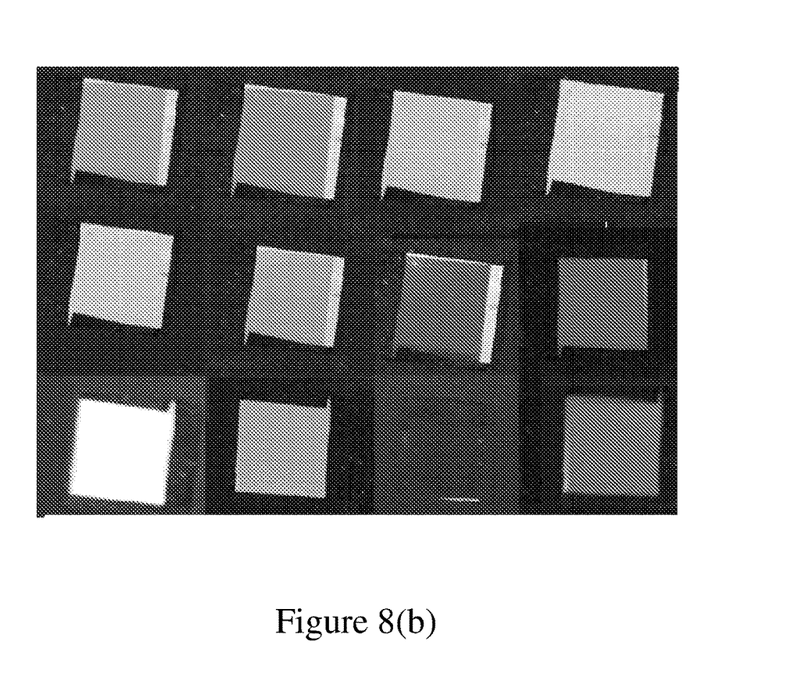
FIG. 8(b) is a grayscale version of an image showing examples of various colors achievable by the FSC display of FIG. 8(a).

FIG. 8(b) is an image showing examples of various colors achievable by the FSC display of FIG. 8(a). Although in the present application, the image is reproduced in grayscale such that the original colors are not shown, this image corresponds to demonstrations that the FSC display of FIG. 8(a) is able to produce various colors and various shades of such colors, while achieving high brightness and contrast.

Embodiments of the invention thus provide standing helix ferroelectric liquid crystal display cells that are able to achieve fast response time and continuous gray scale, such that, for example, FSC LCD displays utilizing embodiments of the invention will have full vivid colors, low power consumption and high brightness and contrast, as well as being easy to manufacture (e.g., complex material processing and complicated electrode structures are not required).

In an exemplary embodiment, a standing helix ferroelectric liquid crystal display cell includes: a ferroelectric liquid crystal sandwiched between two transparent substrate with the helix axis perpendicular to the substrate, wherein a chiral smectic liquid crystal helix pitch is shorter than the wavelength of a polarized light normally impinging onto substrates subjected to the electric field applied by an inter-digital electrodes in the substrates plane, while the driving voltage is below than the critical voltage of the helix unwinding.

In an exemplary embodiment, the transparent substrates are made of glass or plastic.

In an exemplary embodiment, the inter-digital electrodes are provided by patterning any transparent conductive layer (e.g., transparent electrodes mostly made of indium tin oxide (ITO)).

In an exemplary embodiment, a vertical alignment based on an alignment layer on one or both substrates provides the standing helix configuration for the liquid crystals of the liquid crystal layer (i.e., vertical alignment material treatment provides for the standing helix configuration).

In an exemplary embodiment, the alignment layer is stearic acid chromium salt dissolved in any solvent.

In an exemplary embodiment, the driving voltage is provided via the inter-digital electrodes through active or passive addressing (e.g., using an active matrix or passive matrix addressing scheme).

In an exemplary embodiment, the liquid crystal has one equilibrium state characterized by the undistorted helix, which is polarization independent to the light propagating along the helix axis, if the voltage is not applied. That is, in the standing helix configuration, the helix is parallel to the direction of the propagation of the light. If the helix is sufficiently small, as discussed above, the light passing through it does not experience any birefringence. Thus, in the absence of the electric field, the liquid crystal behaves like an isotropic medium which is insensitive to the polarization of the impinging light.

In an exemplary embodiment, the driving voltage provides a modulation of light, which is continuous, hysteresis free and insensitive to the driving voltage polarity. That is, the electro-optical response of the system is the same for both polarities of the electric field and does not show any hysteresis.

In an exemplary embodiment, the helix pitch is shorter than the wavelength of polarized light passing through a liquid crystal layer, in order to avoid the effect of the polarization plane rotation, diffraction and scattering of the light passed along the helix axis. In other words, the light passing thought the display cell is polarized and, if the pitch of the material were to be large enough, it might work as waveguide and due to the pitch rotate the plane of the polarization for the impinging light. However, if the pitch is sufficiently smaller than the impinging light wavelength, the impinging light does not show diffraction or scattering.

In an exemplary embodiment, the inter-digital electrodes on one or both of the substrates are used for application of an electric field parallel to the substrates.

In an exemplary embodiment, the frequency of the applied voltage is within the range between 10 Hz and 5 kHz.

In exemplary embodiments, both a transmission mode and a reflection mode are used. Thus, exemplary embodiments may be used for both transmissive displays and reflective displays.

In an exemplary embodiment, the standing helix ferroelectric liquid crystal display cell is incorporated in an FSC display, which is configured to generate a color image based on integration of sub-images corresponding to fast-switched distinct color fields.

In an exemplary embodiment, the FSC display includes three distinct color fields.

In an exemplary embodiment, the optical gray scale for the color image is generated via analog addressing for the different color fields.

In an exemplary embodiment, the optical gray scale for the color image is generated via digital addressing for the different color fields.

In exemplary embodiments, the standing helix ferroelectric liquid crystal display cell may be used in connection with in-plane switching (IPS) and fringe-field switching (FFS) modes of LCD devices.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A standing helix ferroelectric liquid crystal display cell, comprising:
   two transparent substrates;
   a ferroelectric liquid crystal layer comprising ferroelectric liquid crystals in a vertically-aligned standing helix configuration, the ferroelectric liquid crystal layer being disposed between the two transparent substrates, the ferroelectric liquid crystals having a helix axis perpendicular to the two transparent substrates and chiral smectic liquid crystal helix pitch shorter than a wavelength of polarized light normally impinging on at least one of the two transparent substrates;
   inter-digital electrodes, disposed in plane with the two transparent substrates, configured to apply an electric field to the ferroelectric liquid crystal layer that provides a driving voltage below a critical voltage for helix unwinding; and
   an alignment layer disposed on at least one of the two transparent substrates, configured to provide the vertical alignment for the ferroelectric liquid crystals.

2. The standing helix ferroelectric liquid crystal display cell according to claim 1, wherein the two transparent substrates comprise glass or plastic.

3. The standing helix ferroelectric liquid crystal display cell according to claim 1, wherein the inter-digital electrodes comprise patterned transparent conductive layers.

4. The standing helix ferroelectric liquid crystal display cell according to claim 1, wherein the alignment layer comprises stearic acid chromium salt dissolved in a solvent.

5. The standing helix ferroelectric liquid crystal display cell according to claim 1, wherein the driving voltage is provided using active or passive addressing.

6. The standing helix ferroelectric liquid crystal display cell according to claim 1, wherein the ferroelectric liquid crystals have an equilibrium state characterized by an undistorted helix while the driving voltage is not applied, wherein the equilibrium state is configured to be polarization independent to light propagating along the helix axis.

7. The standing helix ferroelectric liquid crystal display cell according to claim 1, wherein application of the driving voltage provides continuous modulation of light that is hysteresis free and insensitive to the driving voltage polarity.

8. The standing helix ferroelectric liquid crystal display cell according to claim 1, wherein the ferroelectric liquid crystal layer is configured, based on the helix pitch, to avoid effects of polarization plane rotation, diffraction and scattering on light passing along the helix axis.

9. The standing helix ferroelectric liquid crystal display cell according to claim 1, wherein at least one of the inter-digital electrodes is configured to apply an electric field parallel to the two transparent substrates.

10. The standing helix ferroelectric liquid crystal display cell according to claim 1, wherein frequency of the driving voltage is within a range from 10 Hz to 5 kHz.

11. The standing helix ferroelectric liquid crystal display cell according to claim 1, wherein the ferroelectric liquid crystal display cell is configured to provide a transmissive mode.

12. The standing helix ferroelectric liquid crystal display cell according to claim 1, wherein the ferroelectric liquid crystal display cell is configured to provide a reflective mode.

13. A field sequential color display, comprising a standing helix ferroelectric liquid crystal display cell, the standing helix ferroelectric liquid crystal display cell comprising:
  two transparent substrates;
  a ferroelectric liquid crystal layer comprising ferroelectric liquid crystals in a vertically-aligned standing helix configuration, the ferroelectric liquid crystal layer being disposed between the two transparent substrates, the ferroelectric liquid crystals having a helix axis perpendicular to the two transparent substrates and chiral smectic liquid crystal helix pitch shorter than a wavelength of polarized light normally impinging on at least one of the two transparent substrates;
  inter-digital electrodes, disposed in plane with the two transparent substrates, configured to apply an electric field to the ferroelectric liquid crystal layer that provides a driving voltage below a critical voltage for helix unwinding; and
  an alignment layer disposed on at least one of the two transparent substrates, configured to provide the vertical alignment for the ferroelectric liquid crystals;
  wherein the field sequential color display is configured to generate a color image by integration of images in fast switching distinct color fields.

14. The field sequential color display according to claim 13, comprising:
  at least three distinct color fields.

15. The field sequential color display according to claim 13, wherein the field sequential color display is configured to generate optical gray scale based on analog addressing for the distinct color fields.

16. The field sequential color display according to claim 13, wherein the field sequential color display is configured to generate optical gray scale based on digital addressing for the distinct color fields.

* * * * *